United States Patent
Mimura

(10) Patent No.: US 11,186,297 B2
(45) Date of Patent: Nov. 30, 2021

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventor: Yoshitaka Mimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 16/463,417

(22) PCT Filed: Nov. 29, 2016

(86) PCT No.: PCT/JP2016/085343
§ 371 (c)(1),
(2) Date: May 23, 2019

(87) PCT Pub. No.: WO2018/100619
PCT Pub. Date: Jun. 7, 2018

(65) Prior Publication Data
US 2021/0114619 A1  Apr. 22, 2021

(51) Int. Cl.
*B60W 60/00* (2020.01)
*B60W 10/20* (2006.01)
(Continued)

(52) U.S. Cl.
CPC ........ *B60W 60/0013* (2020.02); *B60W 10/20* (2013.01); *B60W 40/08* (2013.01);
(Continued)

(58) Field of Classification Search
None
See application file for complete search history.

(56) References Cited

U.S. PATENT DOCUMENTS

2008/0309454 A1   12/2008   Tsuji
2012/0083960 A1*  4/2012    Zhu .................. G05D 1/0276
                                                  701/23
(Continued)

FOREIGN PATENT DOCUMENTS

CN   105034984    11/2015
JP   2008-308035  12/2008
(Continued)

OTHER PUBLICATIONS

International Search Report and Written Opinion for International Application No. PCT/JP2016/085343 dated Feb. 21, 2017, 12 pgs.
(Continued)

*Primary Examiner* — Dale W Hilgendorf
*Assistant Examiner* — Alexander C. Bost
(74) *Attorney, Agent, or Firm* — Amin, Turocy & Watson, LLP

(57) ABSTRACT

A vehicle control system includes an automated driving control unit that executes automated driving for autonomously controlling at least one of steering or acceleration and deceleration of a vehicle, an occupant state determination unit that determines a state of an occupant of the vehicle, and a learning unit that learns automated driving control executed by the automated driving control unit so that the state of the occupant determined by the occupant state determination unit approaches a predetermined state on the basis of a combination of a behavior of the vehicle occurring with the automated driving control or a notification to the vehicle occupant of information relating to the automated driving control and the state of the occupant determined by the occupant state determination unit after the behavior of the vehicle or the information notification to the vehicle occupant.

10 Claims, 11 Drawing Sheets

(51) Int. Cl.
*B60W 40/08* (2012.01)
*B60W 50/14* (2020.01)

(52) U.S. Cl.
CPC ......... *B60W 50/14* (2013.01); *B60W 2420/42* (2013.01); *B60W 2420/52* (2013.01); *B60W 2540/22* (2013.01)

(56) References Cited

U.S. PATENT DOCUMENTS

| | | | | |
|---|---|---|---|---|
| 2014/0156133 | A1* | 6/2014 | Cullinane | B60R 22/48 701/23 |
| 2015/0266455 | A1* | 9/2015 | Wilson | B60W 30/10 701/93 |
| 2015/0284009 | A1 | 10/2015 | Cullinane et al. | |
| 2016/0068103 | A1* | 3/2016 | McNew | B60W 30/12 701/23 |
| 2016/0318445 | A1* | 11/2016 | Sugimoto | B60W 60/0027 |
| 2017/0057507 | A1* | 3/2017 | Gordon | B60W 30/16 |
| 2017/0143246 | A1* | 5/2017 | Flickinger | A61B 5/6826 |
| 2017/0291615 | A1* | 10/2017 | Kusano | G07C 5/0808 |
| 2017/0349185 | A1* | 12/2017 | McNew | B60Q 9/00 |
| 2017/0355377 | A1* | 12/2017 | Kumar | B60W 40/08 |
| 2018/0088572 | A1* | 3/2018 | Uchida | B60W 10/18 |
| 2018/0118219 | A1* | 5/2018 | Hiei | B60W 40/09 |
| 2018/0208209 | A1* | 7/2018 | Al-Dahle | B60W 10/22 |
| 2018/0266834 | A1* | 9/2018 | Cronin | H04M 1/6091 |
| 2018/0284774 | A1* | 10/2018 | Kawamoto | B60W 30/09 |

FOREIGN PATENT DOCUMENTS

| | | |
|---|---|---|
| JP | 2010-256943 | 11/2010 |
| JP | 2014-019301 | 2/2014 |
| JP | 2016-020177 | 2/2016 |
| JP | 2016-052881 | 4/2016 |
| WO | 2015-166721 | 11/2015 |

OTHER PUBLICATIONS

Chinese Office Action for Chinese Patent Application No. 201680091125.7 dated Sep. 8, 2021.

\* cited by examiner

| ITEM | EXECUTION DATE | PLACE | BEHAVIOR/CONTENT/CONDITION | OCCUPANT SITUATION ||| |
|---|---|---|---|---|---|---|
| | | | | FACIAL EXPRESSION DETERMINATION | HEART RATE | FACIAL EXPRESSION DETERMINATION |
| LANE CHANGE | 2016/10/17 10:13 | EXPRESSWAY (THREE-LANE) | LATERAL ACCELERATION:**** MINIMUM INTER-VEHICLE DISTANCE:**m | COMFORTABLE | INCREASING | GREAT |
| LANE CHANGE | 2016/10/17 11:01 | EXPRESSWAY (TWO-LANE) | LATERAL G:*** MINIMUM INTER-VEHICLE DISTANCE:**m | UNCOMFORTABLE | INCREASING | GREAT |
| PASSING | 2016/10/17 13:40 | EXPRESSWAY | LATERAL G:*** ACCELERATION:*** | UNCOMFORTABLE | INCREASING | GREAT |
| INTER-VEHICLE DISTANCE | 2016/10/17 11:11 | EXPRESSWAY (TWO-LANE) | MINIMUM INTER-VEHICLE DISTANCE:**m | COMFORTABLE | STABLE | CONSTANT |
| SPEED | 2016/10/17 12:15 | POINT a (X1, Y1) | ACCELERATION:*** | COMFORTABLE | STABLE | CONSTANT |
| SOUND OUTPUT | 2016/10/17 14:15 | POINT b (X2, Y2) | CALLING FOR ATTENTION, VOLUME + 10% | UNCOMFORTABLE | INCREASING | GREAT |
| ⋮ | ⋮ | ⋮ | ⋮ | ⋮ | ⋮ | ⋮ |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In the related art, a driving assistance device that determines the driving condition of a vehicle occupant, and performs a warning or the like in a case where the occupant is driving dangerously is known. In connection with this, there is disclosed a technique for determining an occupant's driving behavior on the basis of a driving behavior determination rule determined in advance from vehicle information and environmental information, constructing a determination unit based on a relationship between the occupant's driving condition and the vehicle information and the environmental information for each driving behavior, and determining a state of the occupant using the constructed determination unit (see, for example, Patent Literature 1).

CITATION LIST

Patent Literature

[Patent Literature 1]
Japanese Unexamined Patent Application, First Publication No. 2010-256943

SUMMARY OF INVENTION

Technical Problem

However, in the method of the related art, since the occupant's driving behavior itself cannot be acquired in a case where a vehicle is traveling through automated driving, it is not possible to ascertain in what automated driving control the occupant feels comfortable and in what automated driving the occupant feels uncomfortable during automated driving. As a result, it has been difficult to execute automated driving control according to the preference of each occupant.

The present invention was contrived in view of such circumstances, and one object thereof is to provide a vehicle control system, a vehicle control method, and a vehicle control program which make it possible to execute automated driving control according to the preference of each occupant.

Solution to Problem

According to an invention of claim 1, there is provided a vehicle control system including: an automated driving control unit (121, 122, 123, 141) that executes automated driving for autonomously controlling at least one of steering or acceleration and deceleration of a vehicle; an occupant state determination unit (160) that determines a state of an occupant of the vehicle; and a learning unit (150) that learns automated driving control executed by the automated driving control unit so that the state of the occupant determined by the occupant state determination unit approaches a predetermined state on the basis of a combination of a behavior of the vehicle occurring with the automated driving control or a notification to the vehicle occupant of information relating to the automated driving control and the state of the occupant determined by the occupant state determination unit after the behavior of the vehicle or the information notification to the vehicle occupant.

An invention according to claim 2 is the vehicle control system according to claim 1, wherein states of the occupant are classified into states including at least a state in which the occupant feels comfortable and a state in which the occupant feels uncomfortable, and the predetermined state is the state in which the occupant feels comfortable.

An invention according to claim 3 is the vehicle control system according to claim 1, further comprising a recognition unit (121) that recognizes a surrounding situation of the vehicle, wherein the learning unit learns the automated driving control on the basis of a combination of the state of the occupant determined by the occupant state determination unit and the surrounding situation recognized by the recognition unit.

An invention according to claim 4 is the vehicle control system according to claim 2, wherein the learning unit instructs the automated driving control unit to maintain a degree of control of automated driving corresponding to a behavior of the vehicle having occurred before it is determined by the occupant state determination unit that the occupant feels comfortable or a notification to the vehicle occupant of information relating to the automated driving, and to change a degree of control of automated driving corresponding to a behavior of the vehicle having occurred before it is determined by the occupant state determination unit that the occupant feels uncomfortable or a notification to the vehicle occupant of information relating to the automated driving.

An invention according to claim 5 is the vehicle control system according to claim 1, wherein the learning unit randomly changes values of control parameters for changing a degree of control relating to the automated driving, and causes the automated driving control unit to execute automated driving at a degree of control based on the changed control parameters.

An invention according to claim 6 is the vehicle control system according to claim 1, wherein the learning unit instructs the automated driving control unit to make the behavior of the vehicle or the notification to the vehicle occupant of information relating to the automated driving higher than at a degree of control relating to existing functions, with respect to a degree of control relating to a function capable of being newly performed by the vehicle.

An invention according to claim 7 is the vehicle control system according to claim 1, further including: an image capture unit (90) that captures an image of the vehicle occupant; and an interface unit (30) that presents information to the occupant, wherein the occupant state determination unit determines a state of the vehicle occupant from an image captured by the image capture unit, and the learning unit causes the interface unit to present information for prompting the occupant to perform an overaction or a predetermined gesture.

An invention according to claim 8 is the vehicle control system according to claim 1, further including a communication unit (20) that transmits and receives data to and from a server device (600), wherein the learning unit transmits a learning result of a degree of control of automated driving according to a surrounding situation to the server device using the communication unit, and causes the automated driving control unit to execute automated driving on the basis of control parameters, received by the communication unit, which have a common tendency in a plurality of vehicles.

According to an invention of claim 9, there is provided a vehicle control method including causing an in-vehicle computer to: execute automated driving for autonomously controlling at least one of steering or acceleration and deceleration of a vehicle; determine a state of an occupant of the vehicle; and learn automated driving control so that the state of the occupant approaches a predetermined state on the basis of a combination of a behavior of the vehicle occurring with the automated driving control to be executed or a notification to the vehicle occupant of information relating to the automated driving control and the state of the occupant determined after the behavior of the vehicle or the information notification to the vehicle occupant.

According to an invention of claim 10, there is provided a vehicle control program causing an in-vehicle computer to: execute automated driving for autonomously controlling at least one of steering or acceleration and deceleration of a vehicle; determine a state of an occupant of the vehicle; and learn automated driving control so that the state of the occupant approaches a predetermined state on the basis of a combination of a behavior of the vehicle occurring with the automated driving control to be executed or a notification to the vehicle occupant of information relating to the automated driving control and the state of the occupant determined after the behavior of the vehicle or the information notification to the vehicle occupant.

Advantageous Effects of Invention

According to the invention of claims 1 to 3, 9 and 10, the vehicle control system can execute automated driving control according to the preference of each occupant.

According to the invention of claim 4, in a case where the state of the occupant after the execution of automated driving is comfortable and a case where it is uncomfortable, the vehicle control system can execute automated driving control according to the preference of each occupant by maintaining or changing the degree of control of automated driving.

According to the invention of claim 5, the vehicle control system can acquire the state of an occupant based on various behaviors of a vehicle, content provided to the occupant according to the behaviors, a condition of a notification to the occupant, or the like by randomly changing the values of the control parameters for changing the degree of control. Therefore, the vehicle control system can acquire the occupant's preference with a higher degree of accuracy.

According to the invention of claim 6, the vehicle control system can collect many learning results relating to a function capable of being newly performed by a vehicle within a predetermined time. Therefore, the vehicle control system can rapidly execute automated driving along the occupant's preference relating to the function capable of being newly performed by a vehicle.

According to the invention of claim 7, the vehicle control system can ascertain the state of an occupant more accurately on the basis of the occupant's overaction or predetermined gesture.

According to the invention of claim 8, the vehicle control system can provide automated driving in which a plurality of occupants feel comfortable to the occupants by executing automated driving having a common tendency acquired by a server device.

BRIEF DESCRIPTION OF DRAWINGS

FIG. 7 is a diagram showing an example of learning data 181.

DESCRIPTION OF EMBODIMENTS

Hereinafter, embodiments of a vehicle control system, a vehicle control method, and a vehicle control program of the present invention will be described with reference to the accompanying drawings.

First Embodiment

Figure 1:
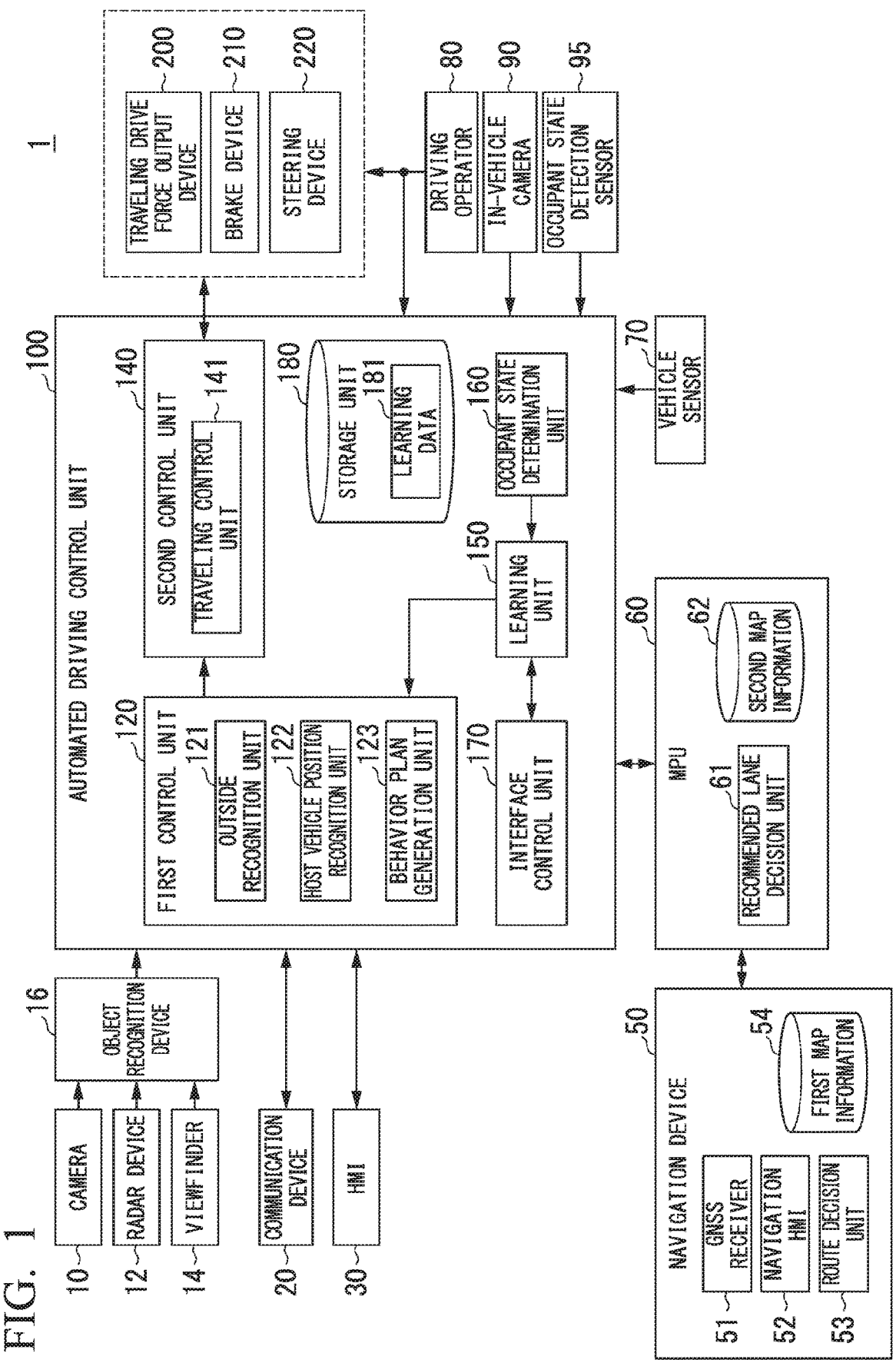
FIG. 1 is a configuration diagram of a vehicle system 1 of a first embodiment.

First, a vehicle control system, a vehicle control method, and a vehicle control program of a first embodiment will be described.
[Overall Configuration]
FIG. 1 is a configuration diagram of a vehicle system 1 of the first embodiment. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a viewfinder 14, an object recognition device 16, a communication device (communication unit) 20, a human machine interface (HMI) 30, a navigation device 50, a micro-processing unit (MPU) 60, a vehicle sensor 70, a driving operator 80, an in-vehicle camera (image capture unit) 90, an occupant state detection sensor 95, an automated driving control unit 100, a traveling drive force output device 200, a brake device 210, and a steering device 220. These devices or instruments are connected to each other through a multiplex communication line such as a controller area network (CAN) communication line, a serial communication line, a wireless communication network, or the like. Meanwhile, the configuration shown in FIG. 1 is merely an example, and portions of the configuration may be omitted, or still other configurations may be added thereto.

In the first embodiment, the "vehicle control system" includes, for example, the HMI 30, the vehicle sensor 70, the in-vehicle camera 90, the occupant state detection sensor 95, and the automated driving control unit 100. The HMI 30 is an example of an "interface unit."

The camera 10 is a digital camera using a solid-state imaging element such as, for example, a charge coupled device (CCD) or a complementary metal oxide semiconductor (CMOS). One or a plurality of cameras 10 are installed at any points of a vehicle having the vehicle system 1 mounted therein (hereinafter referred to as a "host vehicle M"). In a case where a forward image is captured, the camera 10 is installed on the upper portion of the front windshield, the rear surface of the rear-view mirror, or the like. In a case where a backward image is captured, the camera 10 is installed on the upper portion of the rear windshield, the back door, or the like. In a case where a sideward image is captured, the camera 10 is installed on the side mirror or the like. The camera 10, for example, repeatedly captures an image of the vicinity of the host vehicle M periodically. The camera 10 may be a stereo camera.

The radar device 12 radiates radio waves such as millimeter-waves to the vicinity of the host vehicle M, and detects radio waves (reflected waves) reflected from an object to detect at least the position (distance and orientation) of the object. One or a plurality of radar devices 12 are installed at any points of the host vehicle M. The radar device 12 may detect the position and speed of an object with a frequency modulated continuous wave (FMCW) system.

The viewfinder 14 is light detection and ranging or laser imaging detection and ranging (LIDAR) that measures scattered light with respect to irradiation light and detects a distance to an object. One or a plurality of viewfinders 14 are installed at any points of the host vehicle M.

The object recognition device 16 recognizes the position, type, speed, or the like of an object by performing a sensor fusion process on detection results based on some or all of the camera 10, the radar device 12, and the viewfinder 14. The object recognition device 16 outputs recognition results to the automated driving control unit 100.

The communication device 20 communicates with another vehicle which is present in the vicinity of the host vehicle M using, for example, a cellular network, a Wi-Fi network, Bluetooth (registered trademark), dedicated short range communication (DSRC), or the like, or communicates with various server devices through a wireless base station.

The HMI 30 presents various types of information to an occupant of the host vehicle M, and accepts the occupant's input operation. The HMI 30 includes various display devices, a speaker, a buzzer, a touch panel, a switch, a key, or the like.

The navigation device 50 includes, for example, a global navigation satellite system (GNSS) receiver 51, a navigation HMI 52, and a route decision unit 53, and has first map information 54 held in a storage device such as a hard disk drive (HDD) or a flash memory. The GNSS receiver 51 specifies the position of the host vehicle M on the basis of signals received from GNSS satellites. The position of the host vehicle M may be specified or complemented by an inertial navigation system (INS) using an output of the vehicle sensor 70. The navigation HMI 52 includes a display device, a speaker, a touch panel, a key, or the like. A portion or the entirety of the navigation HMI 52 may be shared with the above-described HMI 30. The route decision unit 53 refers to the first map information 54 to decide a route to a destination which is input by an occupant using the navigation HMI 52, for example, from the position (or any input position) of the host vehicle M specified by the GNSS receiver 51. The first map information 54 is, for example, information in which a road shape is represented by a link indicating a road and nodes connected by the link. The first map information 54 may include the curvature of a road, point of interest (POI) information, or the like. The route decided by the route decision unit 53 is output to the MPU 60. In addition, the navigation device 50 may perform route guidance using the navigation HMI 52 on the basis of the route decided by the route decision unit 53. Meanwhile, the navigation device 50 may be realized by the function of a terminal device such as, for example, a smartphone or a tablet terminal possessed by a user. In addition, the navigation device 50 may transmit a current position and a destination to a navigation server through the communication device 20, and acquire a route sent back from the navigation server.

The MPU 60 functions as, for example, a recommended lane decision unit 61, and holds second map information 62 in a storage device such as an HDD or a flash memory. The recommended lane decision unit 61 divides a route provided from the navigation device 50 into a plurality of blocks (for example, divides a route every 100 [m] in a vehicle traveling direction), and refers to the second map information 62 to decide a recommended lane for each block. The recommended lane decision unit 61 decides the number of lane from the left in which a vehicle travels. In a case where a divergence point, a merging point or the like is present in a route, the recommended lane decision unit 61 decides a recommended lane so that the host vehicle M can travel along a reasonable travel route for advancing to a branch destination.

The second map information 62 is map information higher in accuracy than the first map information 54. The second map information 62 includes, for example, information of the center of a lane, information of the boundary of a lane, or the like. In addition, the second map information 62 may contain road information, traffic regulation information, address information (an address or a postal code), facility information, telephone number information, or the like. The road information contains information indicating the type of road such as an expressway, a toll road, a national road, or a prefectural road, or information such as the number of lanes of a road, a region of an emergency parking area, the width of each lane, the gradient of a road, the position (three-dimensional coordinates including longitude, latitude, and altitude) of a road, the curvature of a lane curve, the position of a merging and divergence point of a lane, or a mark provided on a road. The second map information 62 may be updated at any time by accessing another device using the communication device 20.

The vehicle sensor 70 includes a vehicle speed sensor that detects the speed of the host vehicle M, an acceleration sensor that detects acceleration, a yaw rate sensor that detects angular velocity around a vertical axis, an orientation sensor that detects the direction of the host vehicle M, or the like. The acceleration sensor may include, for example, a lateral acceleration sensor that detects gravitational acceleration (hereinafter referred to as "lateral acceleration") relating to the lateral direction of the host vehicle M.

The driving operator 80 includes, for example, an accelerator pedal, a brake pedal, a shift lever, a steering wheel, and other operators. A sensor that detects the amount of operation or the presence or absence of the operation is installed at the driving operator 80, and the detection result is output to one or both of the automated driving control unit 100, or the traveling drive force output device 200, the brake device 210, and the steering device 220.

The in-vehicle camera 90 captures an image of the upper half of the body of an occupant who sits on a seat, centering on the face. The occupant who sits on the seat may be an occupant who sits on a driver's seat, or may be an occupant who sits on a passenger seat or a back seat. A captured image of the in-vehicle camera 90 is output to the automated driving control unit 100.

The occupant state detection sensor 95 is, for example, a heart rate sensor, provided at the backrest portion (seatback) of the seat on which the occupant sits, which radiates radio waves from the backrest portion to the occupant's thorax and detects the occupant's heart rate by detecting the radiated radio waves. In addition, the occupant state detection sensor 95 may be, for example, a sweat rate detection sensor, provided at a steering wheel, which detects a sweat rate from the humidity of a hand clenched by the occupant. In addition, the occupant state detection sensor 95 may be a brain wave sensor that detects the occupant's brain waves, an intracerebral bloodstream sensor that detects a bloodstream within the occupant's brain, or a blood pressure sensor that detects the occupant's blood pressure or the like. In addition, the occupant state detection sensor 95 may be a load sensor that detects the load of the seat on which the occupant sits. The occupant state detection sensor 95 outputs detected information to the automated driving control unit 100.

[Automated Driving Control Unit]

The automated driving control unit 100 includes, for example, a first control unit 120, a second control unit 140, a learning unit 150, an occupant state determination unit 160, an interface control unit 170, and a storage unit 180, and the first control unit 120, the second control unit 140, the learning unit 150, the occupant state determination unit 160, and the interface control unit 170 are realized by a processor such as a central processing unit (CPU) executing programs (software). In addition, some or all of the functional units of the first control unit 120, the second control unit 140, the learning unit 150, the occupant state determination unit 160, and the interface control unit 170 which will be described below may be realized by hardware such as a large scale integration (LSI), an application specific integrated circuit (ASIC), or a field-programmable gate array (FPGA), or may be realized by software and hardware in cooperation. In addition, the software may be modularized in accordance with each function. Some or all of the first control unit 120, the second control unit 140, and the learning unit 150 are an example of the "automated driving control unit." The automated driving control unit executes automated driving for autonomously controlling at least one of the steering or acceleration and deceleration of the host vehicle M. In addition, the storage unit 180 is a storage device such as an HDD or a flash memory.

The first control unit 120 includes, for example, an outside recognition unit (recognition unit) 121, a host vehicle position recognition unit 122, and a behavior plan generation unit 123.

The outside recognition unit 121 recognizes states such as the position, speed, and acceleration of a nearby vehicle on the basis of information which is input from the camera 10, the radar device 12, and the viewfinder 14 through the object recognition device 16. The position of the nearby vehicle may be represented by a representative point such as the centroid or corner of the nearby vehicle, or may be represented by a region which is represented by the contour of the nearby vehicle. The "state" of the nearby vehicle may include the acceleration, jerk, or "behavior state" (for example, whether it is performing or attempting to perform a lane change) of the nearby vehicle.

In addition, the outside recognition unit 121 may recognize a guardrail, a telephone pole, a parked vehicle, a pedestrian, or the positions of other objects in addition to the nearby vehicle.

The host vehicle position recognition unit 122 recognizes, for example, a lane along which the host vehicle M travels (a traveling lane), and the relative position and posture of the host vehicle M with respect to the traveling lane. The host vehicle position recognition unit 122 recognizes the traveling lane, for example, by comparing the pattern (for example, an array of a solid line and a broken line) of a road division line which is obtained from the second map information 62 with the pattern of the road division line in the vicinity of the host vehicle M which is recognized from an image captured by the camera 10. In this recognition, the position of the host vehicle M which is acquired from the navigation device 50 or a processing result based on an INS may be added.

Figure 2:
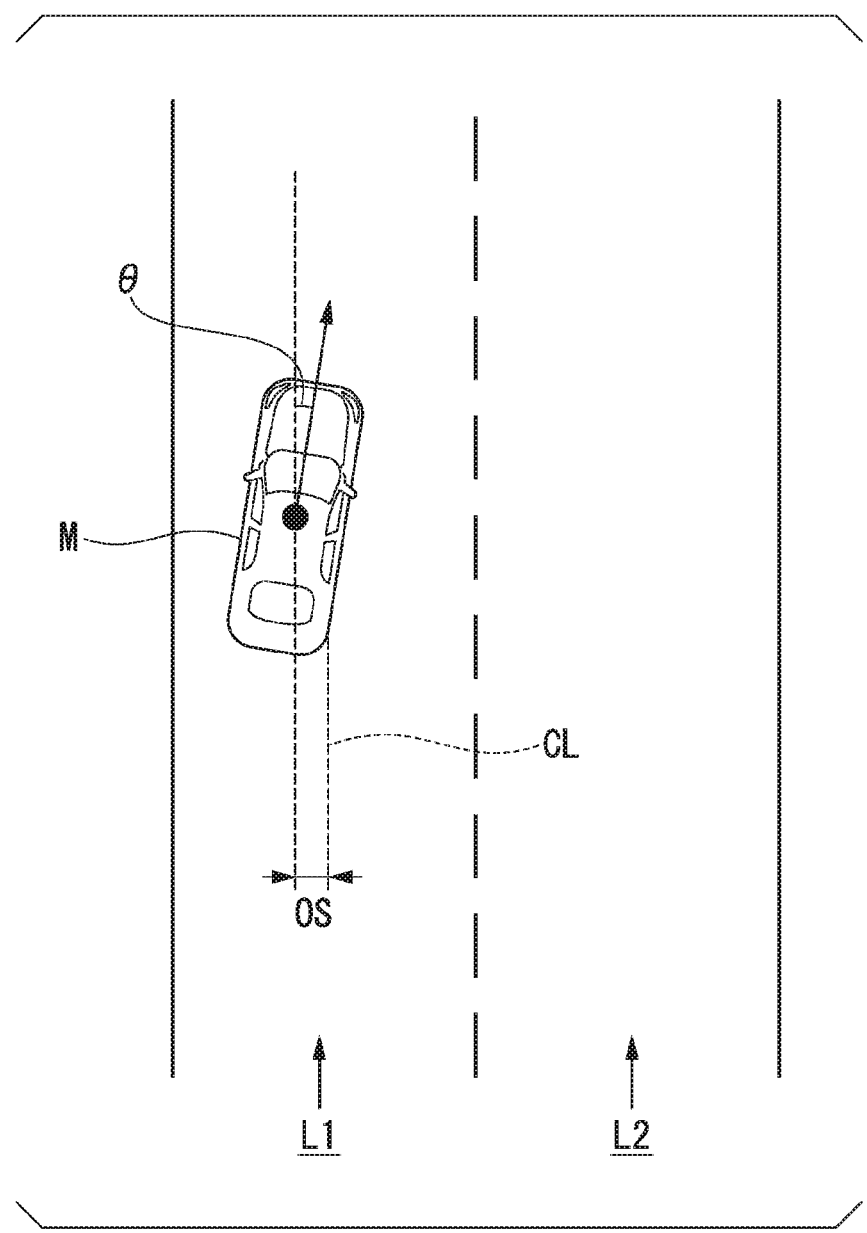
FIG. 2 is a diagram showing a state in which the relative position and posture of a host vehicle M with respect to a traveling lane L1 is recognized by the host vehicle position recognition unit 122.

The host vehicle position recognition unit 122 recognizes, for example, the position or posture of the host vehicle M with respect to the traveling lane. FIG. 2 is a diagram showing a state in which the relative position and posture of the host vehicle M with respect to the traveling lane L1 is recognized by the host vehicle position recognition unit 122. The host vehicle position recognition unit 122 recognizes, for example, an angle θ to a line that links deviation OS of a reference point (for example, centroid) of the host vehicle M from a traveling lane center CL to the traveling lane center CL in the traveling direction of the host vehicle M as the relative position and posture of the host vehicle M with respect to the traveling lane L1. Meanwhile, instead, the host vehicle position recognition unit 122 may recognize the position of the reference point of the host vehicle M or the like with respect to either side end portion of the traveling lane L1 as the relative position of the host vehicle M with respect to the traveling lane. The relative position of the host vehicle M which is recognized by the host vehicle position recognition unit 122 is provided to the recommended lane decision unit 61 and the behavior plan generation unit 123.

[Behavior Plan Generation Unit]

The behavior plan generation unit 123 generates a behavior plan for the host vehicle M to perform automated driving with respect to a destination or the like. For example, the behavior plan generation unit 123 decides events which are sequentially executed in automated driving control so as to travel along a recommended lane decided by the recommended lane decision unit 61 and to be capable of coping with the peripheral situation of the host vehicle M. Examples of the events in automated driving of the first embodiment include a constant speed traveling event of traveling along the same traveling lane at a constant speed, a lane change event of changing the traveling lane of the host vehicle M, a passing event of passing a preceding vehicle, a merging event of causing the host vehicle M to merge at a merging point, a divergence event of causing the host vehicle M to travel in a desired direction at a divergence point of a road, an emergency stop event of urgently stopping the host vehicle M, a switching event (takeover event) of terminating automated driving and switching the automated driving to manual driving, and the like. In addition, during execution of these events, behavior for avoidance may be planned on the basis of the surrounding situation (such as the presence of a nearby vehicle or a pedestrian, or lane narrowing caused by road construction) of the host vehicle M.

The behavior plan generation unit 123 generates a target trajectory along which the host vehicle M will travel in the future. The target trajectory is represented as points (trajectory points), lined up in order, to be reached by the host vehicle M. The trajectory point is a point to be reached by the host vehicle M for each predetermined traveling distance, and aside from this, target speed and target acceleration for each predetermined sampling time (for example, approximately zero comma several [sec]) are generated as a portion of the target trajectory. In addition, the trajectory point may be a position, for each predetermined sampling time, to be reached by the host vehicle M at the sampling time. In this case, information of the target speed or the target acceleration is represented by an interval between trajectory points.

Figure 3:
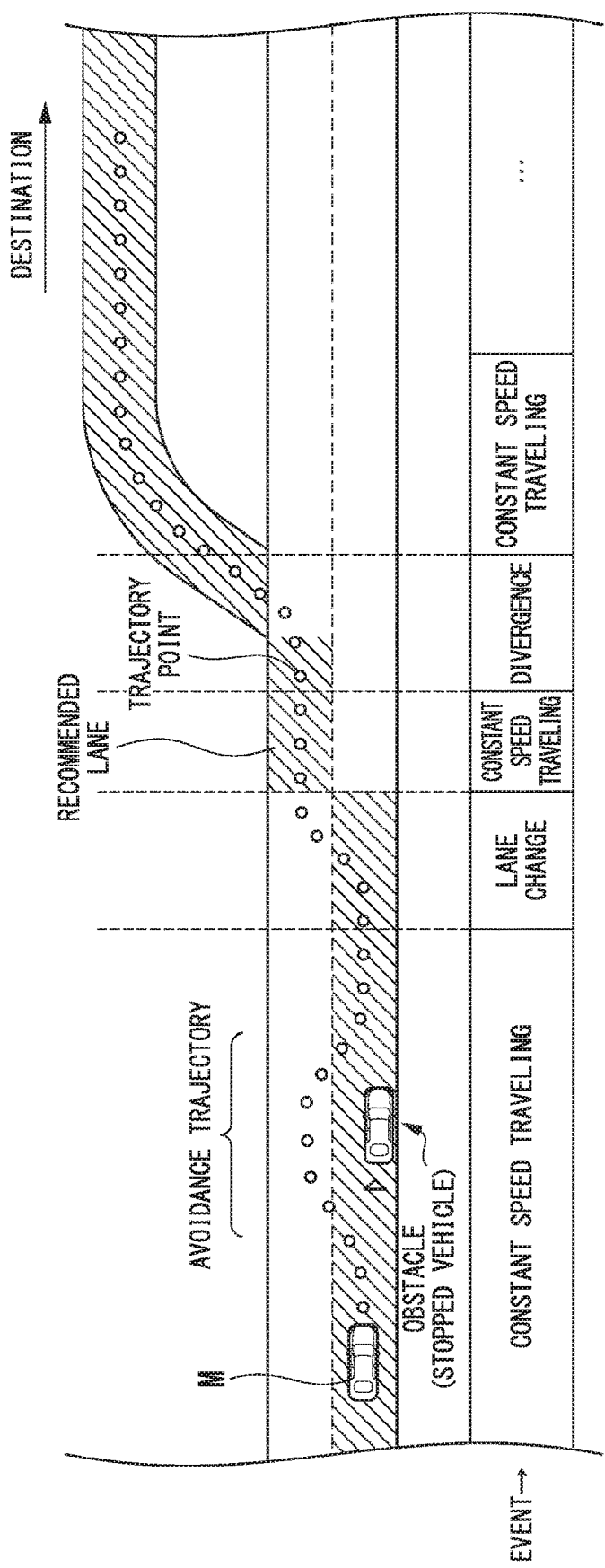
FIG. 3 is a diagram showing a state in which a target trajectory is generated on the basis of a recommended lane.

FIG. 3 is a diagram showing a state in which a target trajectory is generated on the basis of a recommended lane. As shown in the drawing, the recommended lane is set to be advantageous to travel along a route to a destination. In a case where a vehicle arrives at a predetermined distance (which may be decided in accordance with the type of event) in front of a switching point of a recommended lane, the behavior plan generation unit 123 starts the lane change event, the divergence event, the merging event, or the like. In a case where it is necessary to avoid an obstacle during execution of each event, an avoidance trajectory is generated as shown in the drawing.

The behavior plan generation unit 123 generates, for example, candidates for a plurality of target trajectories, and selects an optimum target trajectory suitable for a route to a destination at that point in time on the basis of the viewpoint of safety and efficiency. In addition, the behavior plan generation unit 123 changes a portion or the entirety of one selected target trajectory on the basis of an instruction from the learning unit 150, and generates a target trajectory for learning. In addition, the behavior plan generation unit 123 corrects the one selected target trajectory on the basis of a result learned by the learning unit 150.

The second control unit 140 includes, for example, a traveling control unit 141. The traveling control unit 141 controls the traveling drive force output device 200, the brake device 210, and the steering device 220 so that the host vehicle M passes through the target trajectory generated by the behavior plan generation unit 123 on schedule.

[Learning Unit]

The learning unit 150 learns the degree of control of appropriate automated driving according to the surrounding situation of the host vehicle M on the basis of a combination of the behavior of the host vehicle M occurring with automated driving or a notification to the vehicle occupant of information relating to the automated driving and the state of the occupant after the behavior performed by the host vehicle M or after the information notification to the occupant.

Here, the behavior performed by the host vehicle M is, for example, the lateral acceleration of the host vehicle M or the like. The behavior of the host vehicle M may be, for example, the front-rear acceleration, jerk, speed, angular velocity, or the like of the host vehicle M. In addition, the information notification to the occupant is, for example, information (such as notification or information provision) which is output from the HMI 30 with respect to automated driving.

The state of the occupant is classified into, for example, states including at least a good state and a bad state. The good state is, for example, is a state in which the occupant feels comfortable. The bad state is a state in which the occupant feels uncomfortable. For example, the occupant state determination unit 160 to be described later compares the facial expression (mouth, eyes, or inclination of eyebrows) or complexion of the occupant's face obtained from a captured image of the in-vehicle camera 90 with a predetermined pattern registered in advance, and thus the comfortable state or the uncomfortable state may be determined on the basis of whether a difference with respect to the pattern is within a predetermined value, or may be determined from a heart rate, a sweat rate, or the like obtained from the occupant state detection sensor 95.

More specifically, when the expression pattern of the occupant's face is an expression close to a smile or a normal expression, or when a heart rate or a sweat rate is less than a predetermined reference value, the occupant state determination unit 160 may determine that the occupant feels comfortable. In addition, when the expression pattern of the occupant's face is an expression close to a state of a frowning face, when eye movement per unit time or a change in face direction is more than a predetermined frequency, when a heart rate or a sweat rate is equal to or higher than a predetermined reference value, or the like, the occupant state determination unit 160 may determine that the occupant feels uncomfortable. In addition, when a predetermined gesture such as leaning the head to one side is detected, the occupant state determination unit 160 may determine that the occupant feels uncomfortable.

In addition, when a predetermined brain wave pattern defined in advance is observed from the brain waves of the occupant detected by the occupant state detection sensor 95, the occupant state determination unit 160 may determine that the occupant feels comfortable or uncomfortable. In addition, in a case where the pitch of voice becomes higher than during an ordinary state, the occupant state determination unit 160 may determine that the occupant feels uncomfortable.

In addition, the occupant state determination unit 160 may determine that the occupant feels uncomfortable on the basis of the occupant's reflex behavior after the occupant of the host vehicle M is notified of information. Examples of the reflex behavior include behaviors of moving a foot to the brake pedal of the driving operator 80, operating the brake pedal, extending a hand to the steering wheel, grasping the steering wheel, or the like. These behaviors may be detected from an image of the in-vehicle camera 90, or may be detected depending on whether operation input based on the driving operator 80 has been accepted.

In addition, in a case where the occupant of the host vehicle M is notified of information and then the load of a seat detected by the occupant state detection sensor 95 is changed, the occupant state determination unit 160 may estimate that the occupant has performed a posturing behavior upon receiving an information notification, and determine that the occupant feels comfortable.

In addition, learning the degree of control of appropriate automated driving involves, for example, patterning the surrounding situation of a vehicle recognized by the outside recognition unit 121 depending on, for example, any situation, conditions or the like to make the patterned surrounding situation correspond to finite patterns, and the host vehicle M learning what automated driving control is to be executed thereafter depending on the degree of control.

In addition, learning what automated driving control is to be executed depending on the degree of control involves maintaining the degree of control of automated driving corresponding to the behavior of the host vehicle M having occurred before it is determined by the occupant state determination unit 160 to be described later that the occupant feels comfortable, for example, during automated driving or the notification to the vehicle occupant of information relating to the automated driving. In addition, learning what automated driving control is to be executed depending on the degree of control involves instructing the first control unit 120 to change the degree of control of automated driving corresponding to the behavior of the host vehicle M having occurred before it is determined that the occupant is in a state of feeling uncomfortable or the notification to the occupant of the host vehicle M of information relating to the automated driving. Changing the degree of control involves, for example, making a change so that the state of the occupant determined by the occupant state determination unit 160 approaches a predetermined state. The predetermined state is, for example, a state in which the occupant feels comfortable.

The learning unit 150 generates control parameters for changing the behavior of the host vehicle M, content provided to the occupant according to the behavior, the condition of a notification to the occupant, or the like with respect to a behavior plan which is generated by the behavior plan generation unit 123, and outputs a change instruction for the behavior plan together with the generated control parameters to the first control unit 120. The control parameter is, for example, a change width for the degree of control according to an object (situation) to be operated in automated driving.

Figure 4:
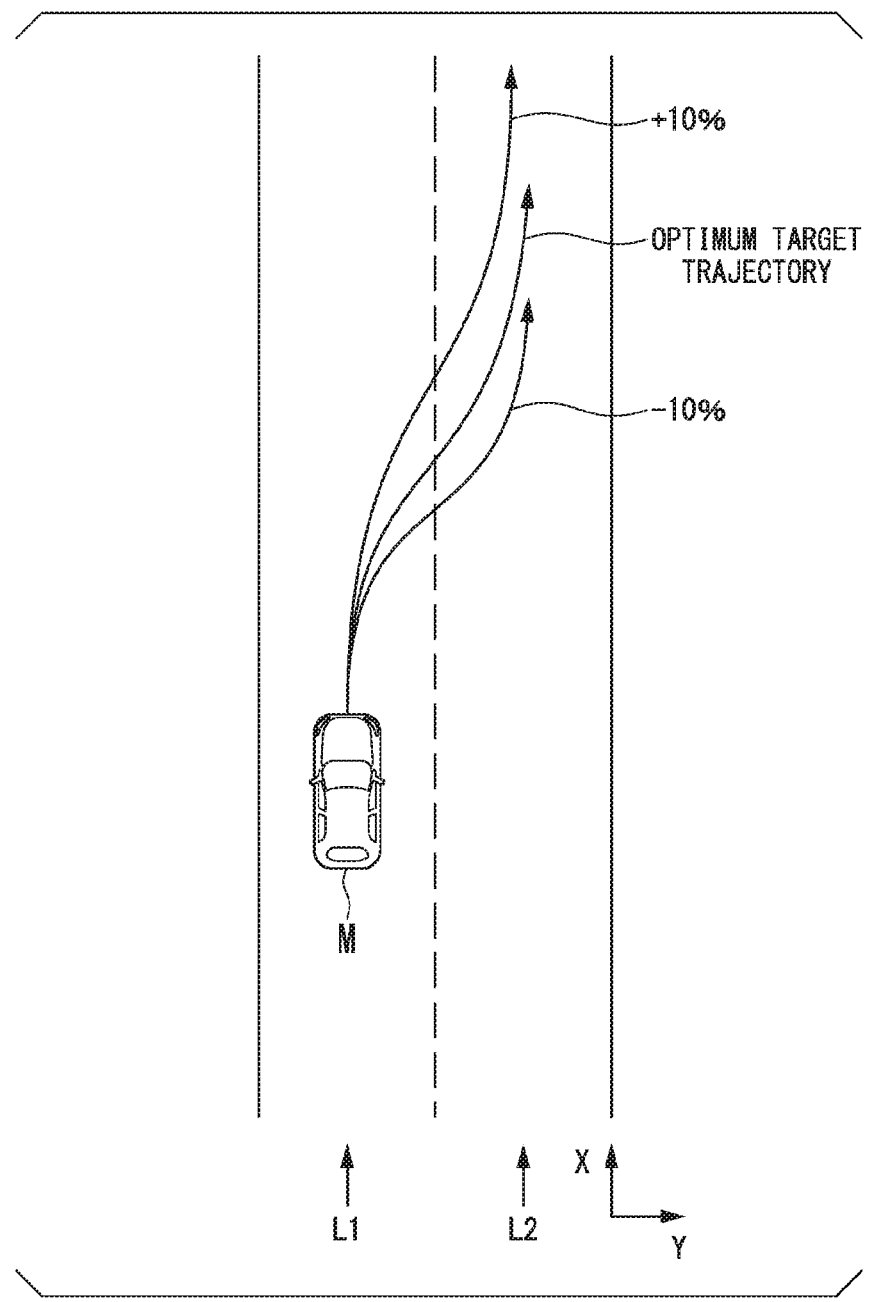
FIG. 4 is a diagram showing an example of a behavior plan which is changed by a behavior plan generation unit 123 according to an instruction of a learning unit 150.

FIG. 4 is a diagram showing an example of a behavior plan which is changed by the behavior plan generation unit 123 according to an instruction of the learning unit 150. The example of FIG. 4 shows an example in which the host vehicle M performs a lane change from the traveling lane L1 to a traveling lane L2 on the basis of the behavior plan generated by the behavior plan generation unit 123.

The learning unit 150 generates control parameters for traveling along a target trajectory in which its change width is set to ±10% with reference to an optimum target trajectory which is generated by the behavior plan generation unit 123, and outputs the generated control parameters and a change instruction for the target trajectory to the behavior plan generation unit 123. This change width is, for example, a change width of a level at which an occupant feels slightly more uncomfortable than an average level, set in advance, at which the occupant does not feel uncomfortable.

In addition, the learning unit 150 may randomly change, for example, values of the control parameters, and change the target trajectory which is generated by the behavior plan generation unit 123 at the degree of control based on the changed control parameters. Thereby, it is possible to acquire the state of an occupant based on various behaviors of the host vehicle M, content provided to the occupant according to the behaviors, the condition of a notification to the occupant, or the like. Therefore, the learning unit 150 can acquire the occupant's preference with a higher degree of accuracy.

In addition, the values of the control parameters which are used by the learning unit 150 may be set in advance, or may be arbitrarily designated by an occupant. In addition, the learning unit 150 may acquire the values of the control parameters from another vehicle, a server device or the like using the communication device 20. In addition, the learning unit 150 may provide the values of the control parameters after learning to another vehicle, a server device or the like. Meanwhile, the learning unit 150 may not only learn the degree of control from the state of the occupant after traveling along the target trajectory changed by the control parameters, but also learn the degree of control from the state of the occupant after traveling along the target trajectory generated by the behavior plan generation unit 123.

In addition, the learning unit 150 may output control parameters for changing a notification to an occupant of automated driving or content of information provision to the interface control unit 170. The change of notification or content of information provision is to, for example, change the size of a character to be displayed, the color of a screen, the magnitude of volume, details (such as content) to be displayed, or the like. In addition, the control parameter in this case is, for example, a change width relating to the size of a character or a change width relating to the magnitude of volume. In addition, the control parameter may be a value for changing the color of a screen from a current color to a predetermined color, information relating to content to be changed and displayed, or the like. In addition, the learning unit 150 may output the control parameters to the interface control unit 170 so that the notification to an occupant or the amount of information provision is made more than a predetermined frequency.

Figure 5:
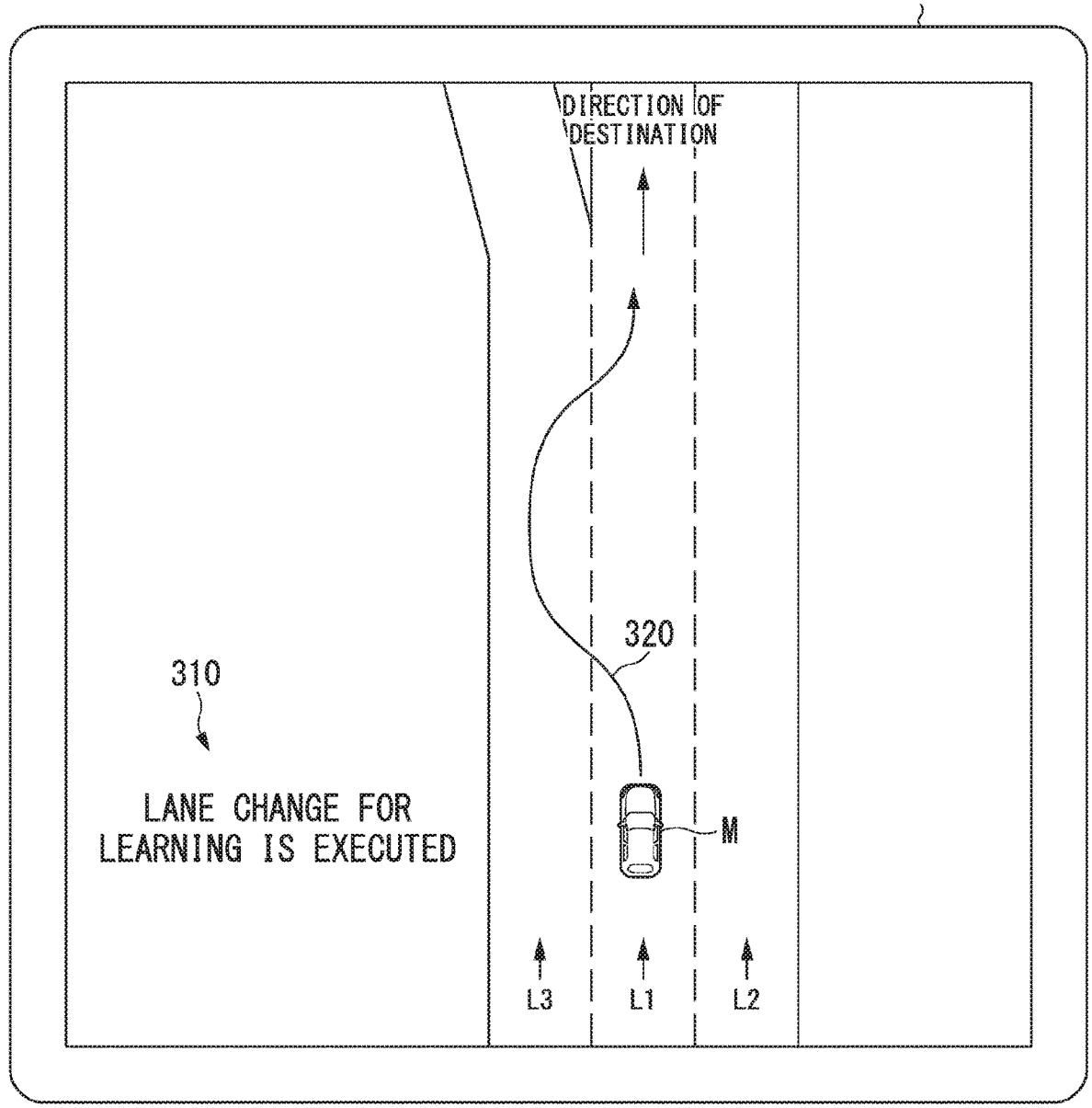
FIG. 5 is a diagram showing an example of information which is output to an HMI 30 during execution of learning in automated driving.

FIG. 5 is a diagram showing an example of information which is output to the HMI 30 during execution of learning in automated driving. In the example of FIG. 5, a screen for performing a lane change is displayed on a display device 31 of the HMI 30.

For example, the learning unit 150 causes the host vehicle M traveling in the direction of a destination on the basis of the behavior plan to execute test traveling for learning of a lane change. In this case, the learning unit 150 outputs the control parameters for executing test traveling for learning of a lane change to the behavior plan generation unit 123. In addition, the interface control unit 170 displays message information 310 indicating the execution of a lane change for learning according to an instruction of the learning unit 150 or a target trajectory 320 during execution of automated driving for learning using the display device 31. In addition, the interface control unit 170 may output a sound of the same content as content displayed using the display device 31, using the speaker of the HMI 30. Thereby, an occupant can easily ascertain performing learning relating to automated driving. Therefore, even in a case where an occupant feels uncomfortable in automated driving for learning, the behavior is automated driving for learning, and thus the occupant can obtain a feeling of relief.

Meanwhile, as shown in FIG. 5, by notifying an occupant of automated driving for learning, the occupant may posture, or make a countenance different from a real feeling. In such a case, there is the possibility of incorrect learning being performed without being able to acquire an actual result. Therefore, regarding a portion of learning, the learning unit 150 may not display a state of being under learning. The portion of learning refers to learning relating to a behavior, content, or a condition having lower control content (change width) than the control content of a lane change, passing or the like, for example, as in an inter-vehicle distance, sound output or the like. In addition, the portion of learning refers to learning in a case where a change width from an optimum target trajectory is a trivial change smaller than a threshold, for example, in a lane change or the like. In such learning, an occupant is not notified of a state of being under learning, and thus it is possible to acquire the more accurate state of the occupant. In addition, since the change width is not large, it is possible to alleviate the occupant's uncomfortable feeling of automated driving.

In addition, the learning unit 150 may instruct the first control unit 120 to make the behavior of the host vehicle M or the notification to the occupant of the host vehicle M of information relating to automated driving higher than at the degree of control relating to existing functions, with respect to the degree of control relating to a function capable of being newly performed by the host vehicle M through update of software or the like of the automated driving control unit 100. Meanwhile, making the degree of control higher includes, for example, making the magnitude of control for a behavior larger or making a frequency for a notification higher.

Thereby, the learning unit 150 can collect many learning results relating to the function capable of being newly performed by the host vehicle M. In addition, the learning unit 150 can rapidly reflect automated driving based on an occupant's preference relating to the function capable of being newly performed by the host vehicle M.

Figure 6:
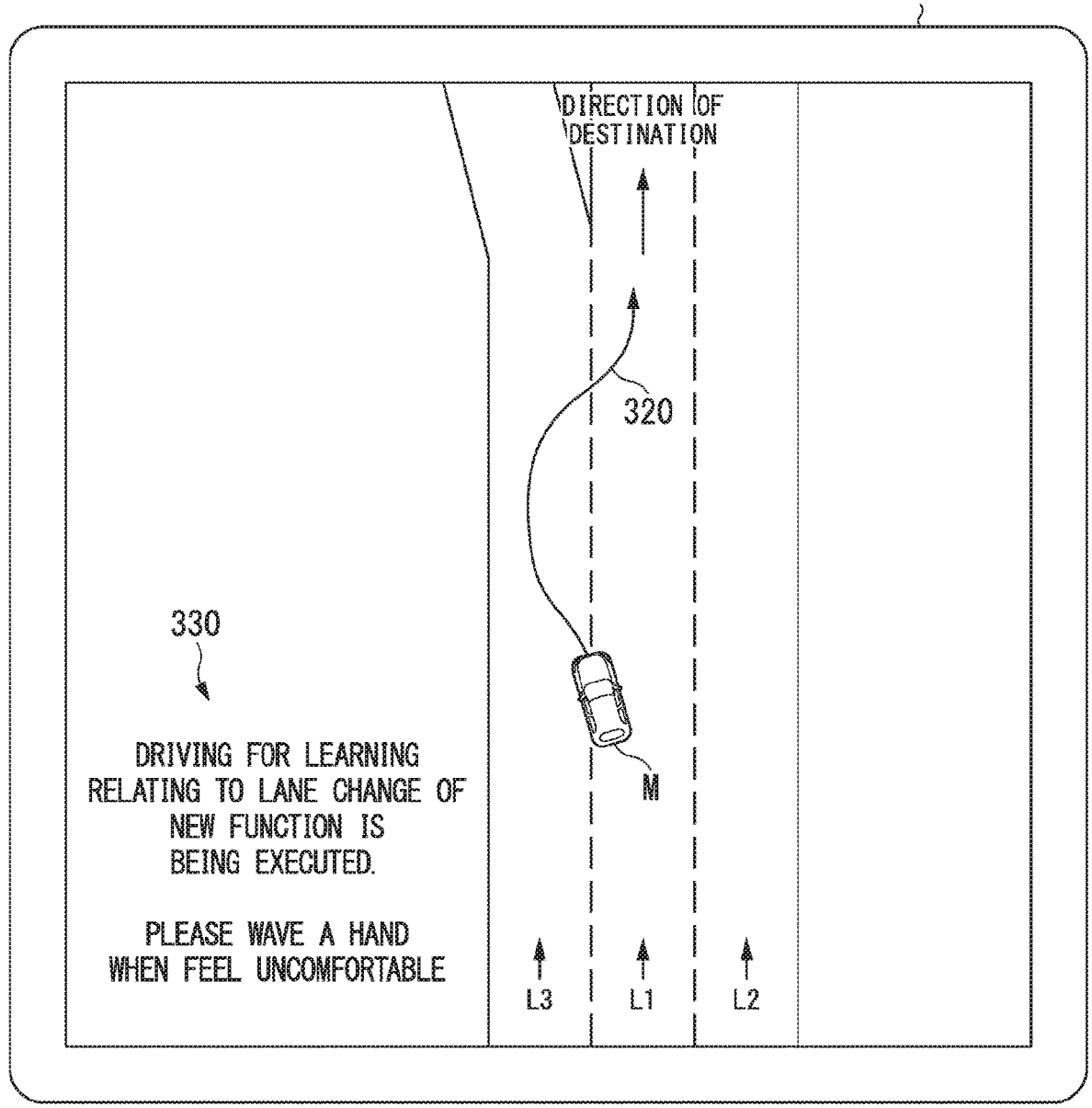
FIG. 6 is a diagram showing an example of message information for prompting an occupant to act.

In addition, the learning unit 150 may output an instruction for outputting a message or the like, prompting an occupant to act from the HMI 30, to the interface control unit 170 so as to perform an overaction or a predetermined gesture. FIG. 6 is a diagram showing an example of message information for prompting an occupant to act. The example of FIG. 6 shows an example of a screen which is displayed on the display device 31 in a case where a lane change for learning is performed similarly to the example of FIG. 5 described above.

For example, the learning unit 150 outputs an instruction to the behavior plan generation unit 123 so as to cause the host vehicle M traveling in the direction of a destination on the basis of a behavior plan to perform a lane change for learning. In addition, the learning unit 150 outputs an instruction, causing the display device 31 to display the target trajectory 320 of a lane change for learning or message information 330 for prompting an operation such as an overaction or a predetermined gesture, to the interface control unit 170.

An example of the predetermined gesture includes an operation of waving a hand in the case of feeling uncomfortable, an operation of wearing a smile in the case of feeling comfortable, or the like. In addition, the predetermined gesture may be previously defined in the host vehicle M, for example, at the time of factory shipment or the like. Thereby, it is possible to improve the recognition of determination of an occupant's state.

In addition, the learning unit 150 may perform learning for a result of automated driving executed by combining a plurality of control parameters. An example of the combination of a plurality of control parameters includes performing a change relating to sound output after a change relating to a lane change is performed, learning the degree of control of automated driving on the basis of the state of an occupant after that, or the like.

In addition, the learning unit 150 associates information of the state of an occupant obtained from the occupant state determination unit with information of control parameters instructed to the behavior plan generation unit 123 or the interface control unit 170, and stores the associated information in learning data 181.

FIG. 7 is a diagram showing an example of the learning data 181. In the example of FIG. 7, the learning data 181 is stored in the storage unit 180, for example, in association with identification information of an occupant of the host vehicle M. In addition, the learning data is stored in the storage unit 180, for example, for each piece of vehicle identification information.

The learning data 181 is configured such that, for example, an execution date, a place, behavior/content/condition, an occupant situation are associated with one another for each item which is executed by the host vehicle M during automated driving.

The item is, for example, an object (scene) which is operated by the host vehicle M during learning of automated driving. The execution date is, for example, information actually indicated by the learning unit 150 of the host vehicle M, and information executed by the behavior plan generation unit 123 or the interface control unit 170. The place is, for example, information indicated by the learning unit 150, and a place in which a process relating to automated driving for learning is executed according to an instruction of the behavior plan generation unit 123 or the interface control unit 170. The place may be, for example, schematic information relating to a traveling lane, or may be position information or the like.

The behavior/content/condition is, for example, a behavior of the host vehicle M for a target trajectory of each scene generated by the behavior plan generation unit 123, content provided to an occupant according to the behavior, a condition of a notification to the occupant, or the like. For example, in a case where the item is a lane change, information relating to lateral acceleration and a minimum inter-vehicle distance from a preceding vehicle is stored. In addition, in a case where the item is output of a sound to an occupant relating to automated driving, information of calling for attention, volume+10% or the like is stored.

The occupant situation is, for example, a facial expression determination, a heart rate, a sweat rate, or the like. These pieces of information are acquired by the occupant state determination unit 160 to be described later.

In addition, the learning unit 150 sets, for example, control parameters relating to the behavior of the host vehicle M during the next automated driving, content provided to an occupant according to the behavior, a condition of a notification to the occupant, or the like from the learning data 181, and outputs the set control parameters to the behavior plan generation unit 123 or the interface control unit 170.

In this manner, the learning unit 150 can rapidly learn an allowable range, a driving preference, or the like relating to automated driving for each occupant by changing an optimum behavior plan generated by the behavior plan generation unit 123 into control parameters rather than traveling based on the behavior plan, performing automated driving, and determining the state of an occupant after the driving.

[Occupant State Determination Unit]

The occupant state determination unit 160 determines whether the state of an occupant is comfortable or uncomfortable with respect to the behavior of the host vehicle M, content provided to the occupant according to the behavior, a condition of a notification to the occupant, or the like on the basis of the occupant's facial expression or complexion when each event or the like in automated driving is executed from a captured image from the in-vehicle camera 90.

Specifically, the occupant state determination unit 160 determines an occupant's facial expression depending on the position or shape of a feature portion such as the eyes, nose, or mouth of a face, the movement amount of the feature portion at a predetermined time, and the like on the basis of the captured image from the in-vehicle camera 90. In a case where the facial expression is determined, the occupant state determination unit 160 can estimate the facial expression, for example, by performing matching with data of the position or shape of a feature amount which is set in advance for each facial expression, the movement amount, and the like.

In addition, in a case where it is estimated that an occupant has a laughing facial expression, the occupant state determination unit 160 determines that the occupant feels the driving to be comfortable. In addition, in a case where it is estimated that the occupant is angry or surprised, the occupant state determination unit 160 determines that the occupant feels the driving to be uncomfortable. In addition, in a case where it is estimated that the complexion is palish, the occupant state determination unit 160 determines that the occupant feels the driving to be uncomfortable. In addition, in a case where it is determined that an operation such as waving a hand which is set in advance is performed, the occupant state determination unit 160 may determine that the occupant feels uncomfortable.

In addition, the occupant state determination unit 160 may determine that a heart rate or a sweat rate is high or low by comparing a heart rate or a sweat rate obtained by the occupant state detection sensor 95 with a heart rate or a sweat rate during stability measured in advance, or a heart rate or a sweat rate set in advance as a reference value. The occupant state determination unit 160 outputs information relating to the determined state of the occupant to the learning unit 150.

The interface control unit 170 causes the HMI 30 to present information indicating that learning in automated driving is being executed or the like in an aspect such as screen display or sound output in association with a scene, an event or the like which is being executed by the behavior plan generation unit 123.

The traveling drive force output device 200 outputs a drive force (torque) for a vehicle to travel to a drive wheel. The traveling drive force output device 200 includes, for example, a combination of an internal-combustion engine, an electric motor, a transmission and the like and an electronic control unit (ECU) that controls these components. The ECU controls the above configuration in accordance with information which is input from the traveling control unit 141 or information which is input from the driving operator 80.

The brake device 210 includes, for example, a brake caliper, a cylinder that transfers hydraulic pressure to the brake caliper, an electric motor that generates hydraulic pressure to the cylinder, and a brake ECU. The brake ECU controls the electric motor in accordance with the information which is input from the traveling control unit 141 or the information which is input from the driving operator 80, and allows a brake torque according to a braking operation to be output to each wheel. The brake device 210 may include, as a backup, a mechanism that transfers hydraulic pressure generated by the operation of the brake pedal included in the driving operator 80 to the cylinder through a master cylinder. Meanwhile, the brake device 210 is not limited to the above-described configuration, and may be an electronic control type hydraulic brake device that controls an actuator in accordance with the information which is input from the traveling control unit 141 or the information which is input from the driving operator 80 and transfers hydraulic pressure of the master cylinder to the cylinder. In addition, the brake device 210 may include a multi-system brake device in consideration of the aspect of safety.

The steering device 220 includes, for example, a steering ECU and an electric motor. The electric motor changes the direction of a turning wheel by causing a force to act on, for example, a rack-and-pinion mechanism. The steering ECU drives the electric motor in accordance with the information which is input from the traveling control unit 141 or the information which is input from the driving operator 80, and changes the direction of the turning wheel.

[Vehicle Control Process]

Figure 8:
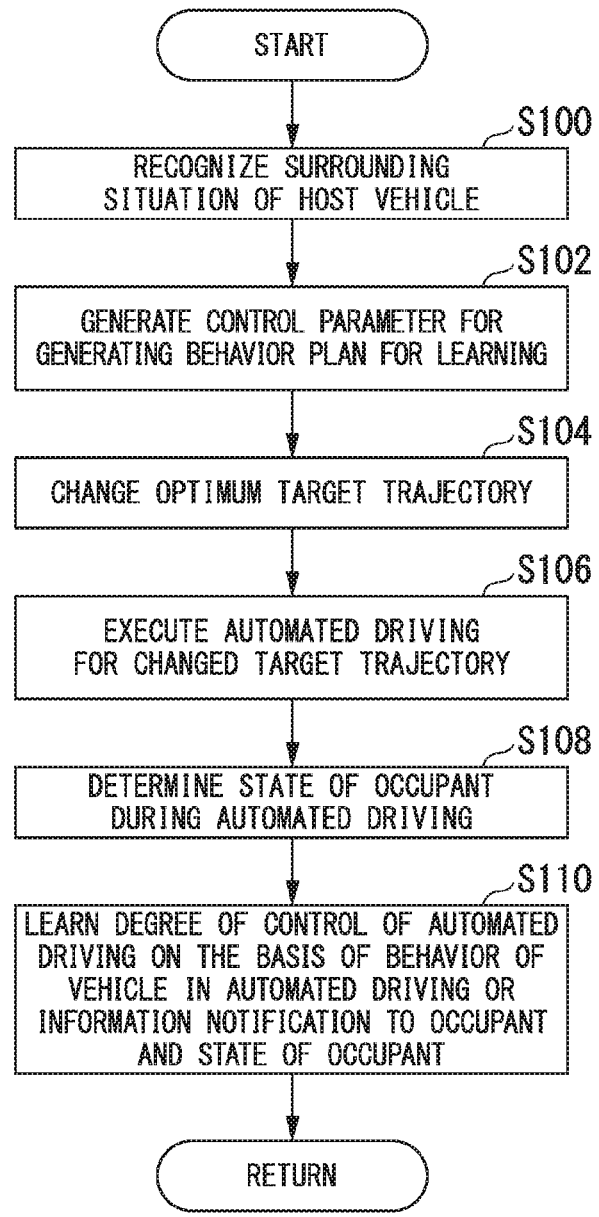
FIG. 8 is a flow chart showing an example of a vehicle control process of the first embodiment.

Hereinafter, various types of vehicle control based on the vehicle system 1 will be described. FIG. 8 is a flow chart showing an example of a vehicle control process of the first embodiment. The process of FIG. 8 is repeatedly executed with a predetermined period, for example, during execution of automated driving.

First, the outside recognition unit 121 recognizes the surrounding situation of the host vehicle M (step S100). Next, the learning unit 150 generates control parameters for causing the behavior plan generation unit 123 to generate a behavior plan for learning (step S102). Next, the behavior plan generation unit 123 changes an optimum target trajectory on the basis of the control parameters generated by the learning unit 150 (step S106). Next, the traveling control unit 141 executes automated driving based on the changed target trajectory (step S106).

Next, the occupant state determination unit 160 determines the state of an occupant during automated driving (step S108). Next, the learning unit 150 learns the degree of control of automated driving according to the surrounding situation on the basis of the behavior of a vehicle in the automated driving or the information notification to the occupant and the state of the occupant (step S110). Thereby, the process of the present flow chart is terminated.

As described above, according to the first embodiment, it is possible to execute automated driving control according to the preference of each occupant. Specifically, according to the first embodiment, in a case where the state of the occupant after the execution of automated driving is comfortable and a case where it is uncomfortable, it is possible to execute automated driving control according to the preference of each occupant by maintaining or changing the degree of control of automated driving. In addition, according to the first embodiment, it is possible to acquire the state of an occupant based on various behaviors of a vehicle, content provided to the occupant according to the behaviors, a condition of a notification to the occupant, or the like by randomly changing the values of the control parameters for changing the degree of control. In addition, according to the first embodiment, it is possible to collect many learning results relating to a function capable of being newly performed by a vehicle within a predetermined time, and to rapidly execute automated driving along the occupant's preference relating to the function capable of being newly performed by a vehicle.

Second Embodiment

Next, a vehicle control system, a vehicle control method, and a vehicle control program of a second embodiment will be described. In the second embodiment, the automated driving control unit 100 transmits the learning data 181 to a server device using the communication device 20, and executes automated driving on the basis of control parameters after statistical processing which are acquired from the server device. Meanwhile, in the following description, the same components as those in the first embodiment are denoted by the same names and reference numerals and signs, and specific description therein will not be given.

[Traffic Information Sharing System]

Figure 9:
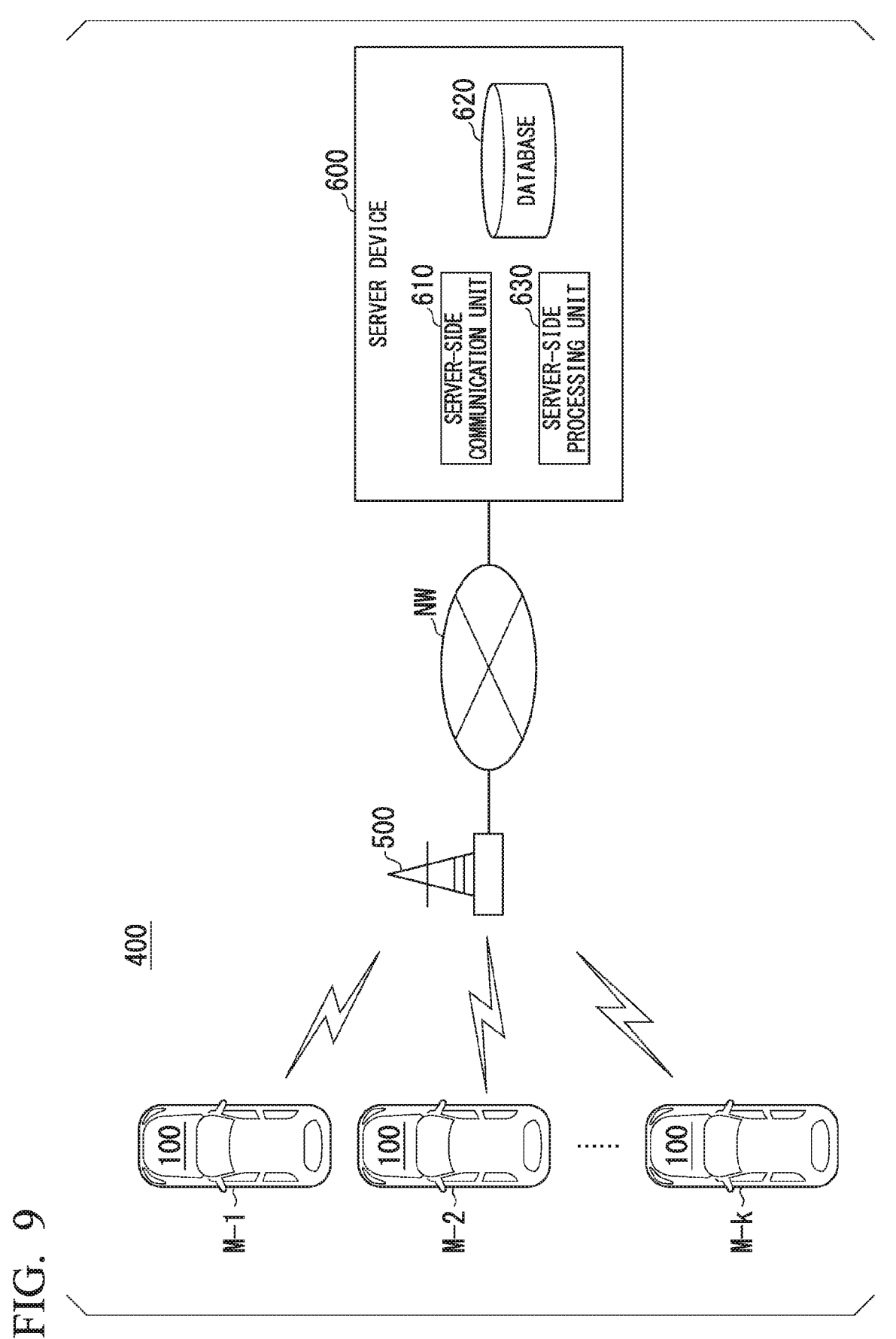
FIG. 9 is a diagram showing an example of a configuration of a traffic information sharing system 400 including an automated driving control unit 100.

FIG. 9 is a diagram showing an example of a configuration of a traffic information sharing system 400 including the automated driving control unit 100. The traffic information sharing system 400 includes a plurality of vehicles M-1 to M-k (k is any natural number) having the automated driving control unit 100 mounted therein, a base station device 500, and a server device 600. For example, a host vehicle M is included in the vehicles M-1 to M-k.

Wireless communication using, for example, a cellular phone network, a Wi-Fi network or the like is performed between the base station device 500 and each of the vehicles M-1 to M-k. In addition, communication through a network NW is performed between the base station device 500 and the server device 600. The network NW is, for example, a wide area network (WAN), a local area network (LAN) or the like. In addition, each vehicle communicates with the server device 600 through the base station device 500.

The server device 600 includes a server-side communication unit 610, a database 620, and a server-side processing unit 630. The server-side communication unit 610 acquires information transmitted by each vehicle through the base station device 500. The server-side communication unit 610 transmits information held by the server device 600 to a predetermined vehicle.

The database 620 stores, for example, information relating to the learning data 181 acquired from each of the vehicles M-1 to M-k, or the like. The server-side processing unit 630 performs statistical processing or the like on information acquired from each of the vehicles M-1 to M-k or information stored in the database 620.

Figure 10:
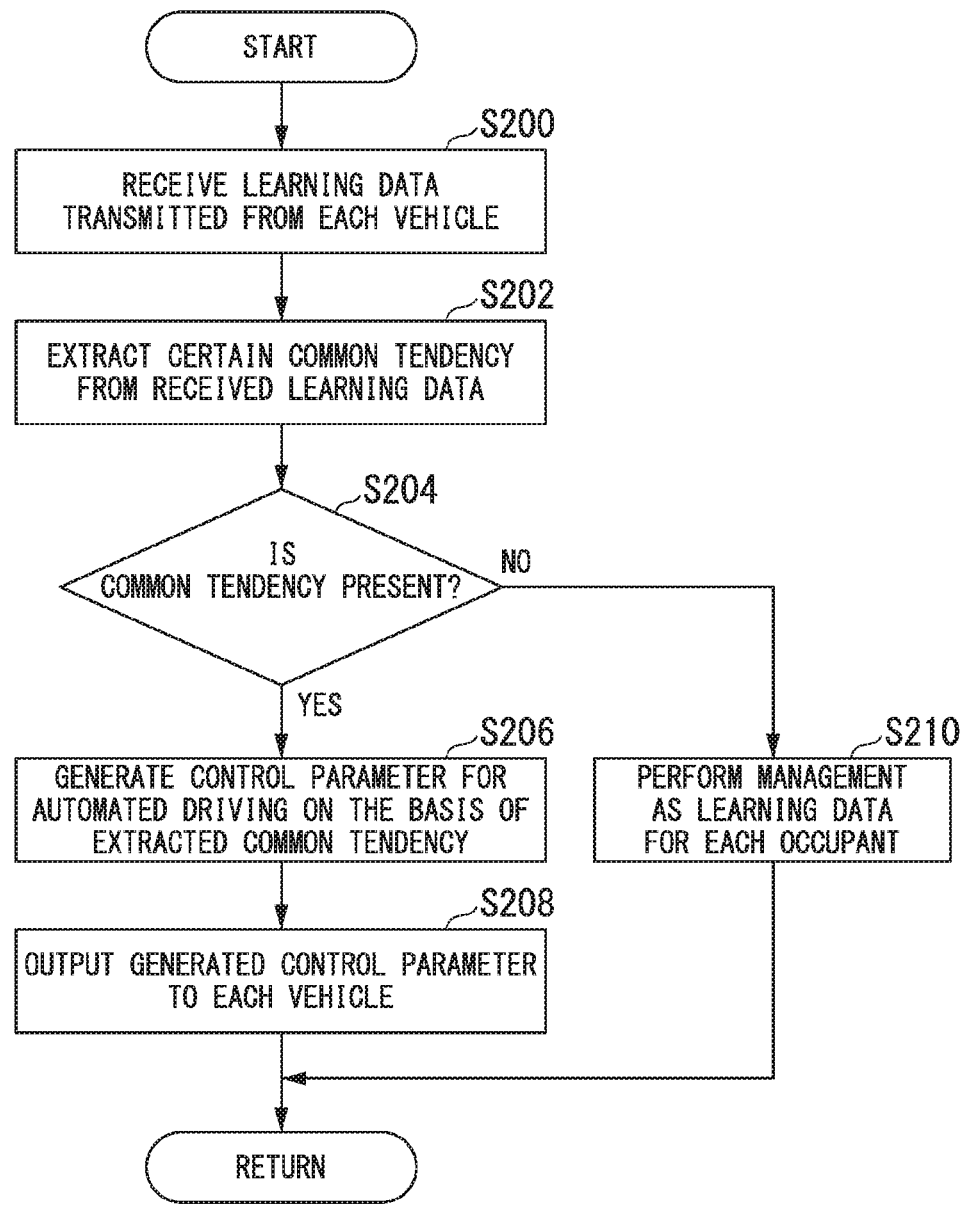
FIG. 10 is a flow chart showing a flow of processes which are executed in a server device 600.

FIG. 10 is a flow chart showing a flow of processes which are executed in the server device 600. The process of FIG. 10 is repeatedly executed, for example, with a predetermined period. The server-side communication unit 610 receives learning data transmitted from each of the vehicles M-1 to M-k (step S200). The learning data is associated with each occupant. In addition, the learning data may be associated with identification information of a vehicle or the like. The received learning data is stored in the database 620.

Next, the server-side processing unit 630 extracts a certain common tendency from the received learning data (step S202). The wording "a certain common tendency" is, for example, a combination in which, regarding conditions and results, the same those appear with high probability. The common tendency refers to, for example, a tendency in which the probability of an occupant feeling comfortable is set to be equal to or more than 80% in a case where lateral acceleration is equal to or less than a threshold at a predetermined time slot, a place or the like in a lane change. The common tendency may be a tendency in which the occupant feels comfortable, or may be a tendency in which the occupant feels uncomfortable.

Next, the server-side processing unit 630 determines whether the common tendency is present (step S204). In a case where the common tendency is present, the server-side processing unit 630 generates control parameters for automated driving on the basis of the extracted common tendency (step S206), and causes the server-side communication unit 610 to output the generated control parameters to each of the vehicles M-1 to M-k (S208). In addition, in a case where the common tendency is not present, the server-side processing unit 630 performs management as learning data for each occupant (step S210). Thereby, the process of the present flow chart is terminated.

Figure 11:
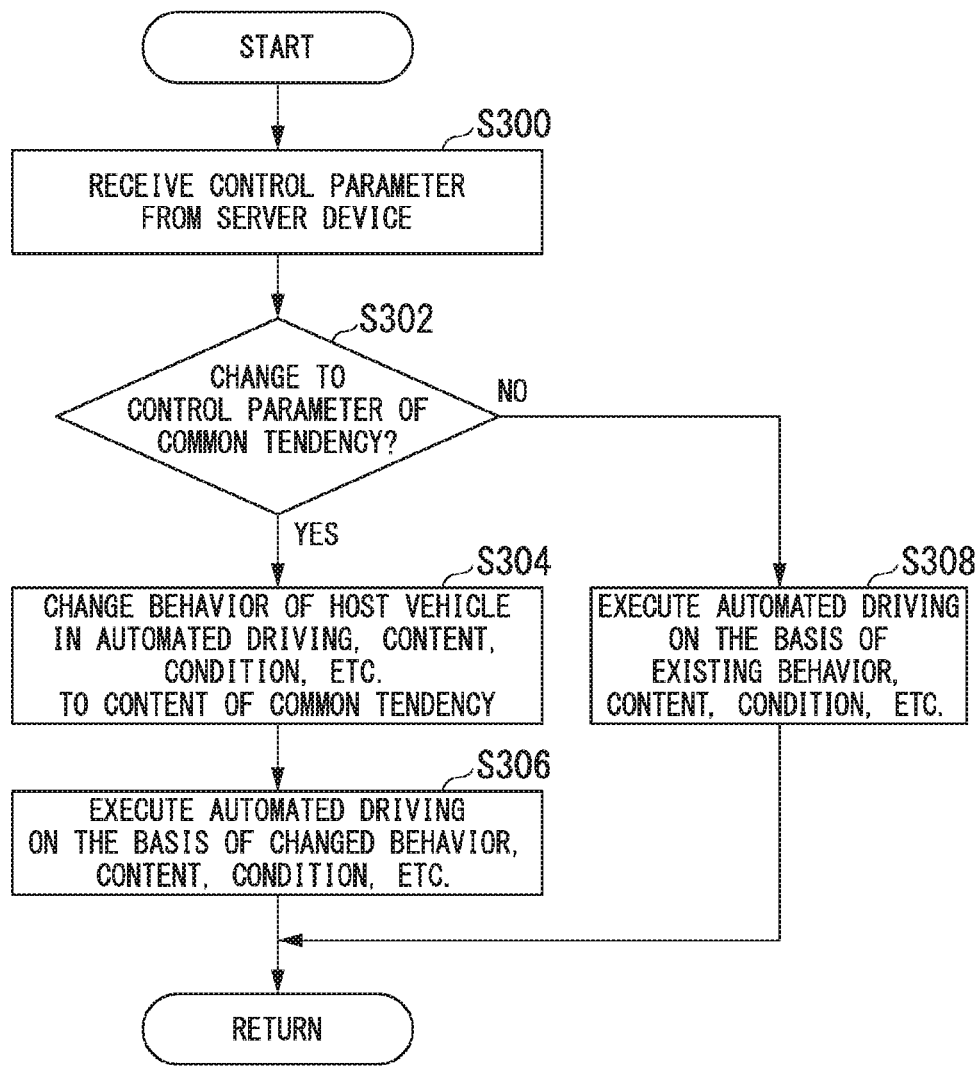
FIG. 11 is a flow chart showing a flow of processes which are performed by the automated driving control unit 100 with respect to control parameters acquired by a server device 600 of a second embodiment.

FIG. 11 is a flow chart showing a flow of processes which are performed by the automated driving control unit 100 with respect to control parameters acquired by the server device 600 of the second embodiment. The process of FIG. 11 is repeatedly executed, for example, with a predetermined period. In the example of FIG. 11, in a case where the control parameters transmitted from the server device 600 are received using the communication device 20 (step S300), the learning unit 150 determines whether control of the behavior plan generation unit 123 or the interface control unit 170 during automated driving is changed to the control parameters based on the common tendency, on the basis of the received control parameters (step S302). In the process of step S302, for example, in a case where an instruction for an occupant not to perform a change is received, or a change to the control parameters based on the common tendency is already performed, the learning unit 150 determines that a change to the control parameters having a common tendency is not performed. In addition, in the other cases, the learning unit 150 performs a change to the control parameter having a common tendency.

In the case of a change to the control parameters having a common tendency, the learning unit 150 changes the behavior of the host vehicle M in automated driving, content provided to the occupant according to the behavior, a condition of a notification to the occupant, and the like to content having a common tendency (step S304). In addition, the behavior plan generation unit 123 executes various processes relating to automated driving according to instructions of the behavior plan generation unit 123 and the interface control unit 170 on the basis of the behavior of the host vehicle M, content provided to the occupant according to the behavior, a condition of a notification to the occupant, and the like which are changed (step S306). In addition, in a case where a change to the control parameters having a common tendency is not performed, the learning unit 150 executes various processes relating to automated driving according to the instructions of the behavior plan generation unit 123 and the interface control unit 170 on the basis of existing behaviors, content provided to the occupant according to the behaviors, a condition of a notification to the occupant, and the like (step S308). Thereby, the process of the present flow chart is terminated.

According to the second embodiment, the server device 600 can provide automated driving in which a plurality of occupants feel comfortable by collecting the learning data of each of the vehicles M-1 to M-k as probe data, performing statistical processing on the collected learning data, and delivering the control parameters to each of the vehicles M-1 to M-k in a case where there is a common tendency in which more than a certain degree of comfort is felt. In addition, according to the second embodiment, it is possible not to reflect control parameters having a common tendency according to an occupant's setting or the like, and to execute automated driving customized for each occupant.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Vehicle system
10 Camera

12 Radar device
14 Viewfinder
16 Object recognition device
20 Communication device
30 HMI
50 Navigation device
60 MPU
70 Vehicle sensor
80 Driving operator
90 In-vehicle camera
95 Occupant state detection sensor
100 Automated driving control unit
120 First control unit
121 Outside recognition unit
122 Host vehicle position recognition unit
123 Behavior plan generation unit
140 Second control unit
141 Traveling control unit
150 Learning unit
160 Occupant state determination unit
170 Interface control unit
180 Storage unit
200 Traveling drive force output device
210 Brake device
220 Steering device
400 Traffic information sharing system
500 Base station device
600 Server device
610 Server-side communication unit
620 Database
630 Server-side processing unit
M Host vehicle

The invention claimed is:

1. A vehicle control system comprising:
a processor that executes automated driving for autonomously controlling at least one of steering or acceleration and deceleration of a vehicle so that the vehicle travels along a target trajectory generated to suit a route to a destination;
the processor determines a state of an occupant of the vehicle;
the processor learns automated driving control of the vehicle based on the state of the occupant being determined to be approaching a predetermined state and based on a following combination of (a) to (c): (a) a behavior of the vehicle occurring with the automated driving control: (b) a notification to the vehicle occupant of information relating to the automated driving control; and (c) the state of the occupant after either the behavior of the vehicle or the information notification to the vehicle occupant; and
the processor notifies the occupant of the information, wherein
the processor generates a changed target trajectory used to learn a portion of the changed target trajectory or an entirety of the target trajectory, and executes automated driving of the vehicle along the changed target trajectory,
wherein the processor, when the automatic driving control based on the target trajectory is being executed, learns the automatic driving control so that the state of the occupant during execution of the automatic driving control based on the changed target trajectory approaches the predetermined state based on the state of the occupant,
wherein the processor, when the automatic driving control to drive the vehicle along the changed target trajectory is being learned, causes the occupant to be notified of the information indicating that the automatic driving control is being executed
wherein the processor, when a width of the changed target trajectory from the target trajectory is smaller than a threshold value, does not cause the occupant to be notified that the automatic driving control is being learned even when the automatic driving control to drive the vehicle along the trajectory is being executed.

2. The vehicle control system according to claim 1,
wherein states of the occupant are classified into states including at least a state in which the occupant feels comfortable and a state in which the occupant feels uncomfortable, and
the predetermined state is the state in which the occupant feels comfortable.

3. The vehicle control system according to claim 1,
wherein the processor recognizes a surrounding situation of the vehicle, and
wherein the processor learns the automated driving control based on a combination of the state of the occupant and the surrounding situation.

4. The vehicle control system according to claim 2,
wherein the processor maintains a degree of control of automated driving corresponding to a behavior of the vehicle having occurred before it is determined that the occupant feels comfortable or the notification to the vehicle occupant of information relating to the automated driving, and changes a degree of control of automated driving corresponding to a behavior of the vehicle having occurred before it is determined that the occupant feels uncomfortable or the notification to the vehicle occupant of information relating to the automated driving.

5. The vehicle control system according to claim 1,
wherein the processor randomly changes values of control parameters for changing a degree of control relating to the automated driving, and executes automated driving at a degree of control based on the changed control parameters.

6. The vehicle control system according to claim 1,
wherein the processor changes the behavior of the vehicle or the notification to the vehicle occupant of information relating to the automated driving to a higher degree of control relating to existing functions, with respect to a degree of control relating to a function capable of being newly performed by the vehicle.

7. The vehicle control system according to claim 1,
wherein the processor:
captures an image of the vehicle occupant; and
presents information to the occupant,
determines a state of the vehicle occupant from the image, and
presents information for prompting the occupant to perform a predetermined gesture.

8. The vehicle control system according to claim 1,
wherein the processor transmits and receives data to and from a server device, and wherein the processor
transmits a learning result of a degree of control of automated driving according to a peripheral situation to the server device, and executes automated driving based on control parameters, received from the server device, which have a common tendency in a plurality of vehicles.

9. A vehicle control method comprising causing an in-vehicle computer to:

execute automated driving for autonomously controlling at least one of steering or acceleration and deceleration of a vehicle so that the vehicle travels along a target trajectory generated to suit a route to a destination;

determine a state of an occupant of the vehicle;

learn automated driving control so that the state of the occupant approaches a predetermined state based on a following combination of (a) to (c): (a) a behavior of the vehicle occurring with the automated driving control to be executed; (b) a notification to the vehicle occupant of information relating to the automated driving control; and (c) the state of the occupant determined after either the behavior of the vehicle or the information notification to the vehicle occupant;

generate a changed target trajectory used to learn a portion of the changed target trajectory or an entirety of the target trajectory, and execute automated driving of the vehicle along the changed target trajectory;

when the automatic driving control based on the target trajectory is being executed, learn the automatic driving control so that the state of the occupant during execution of the automatic driving control based on the changed target trajectory approaches the predetermined state based on the state of the occupant;

when the automatic driving control to drive the vehicle along the changed target trajectory is being learned, notify the occupant of the information indicating that the automatic driving control is being executed; and when a width of the changed target trajectory from the target trajectory is smaller than a threshold value, does not notify the occupant that the automatic driving control is being learned even when the automatic driving control to drive the vehicle along the trajectory is being executed.

10. A non-transitory computer-readable storage medium storing a program that causes an in-vehicle computer to:

execute automated driving for autonomously controlling at least one of steering or acceleration and deceleration of a vehicle so that the vehicle travels along a target trajectory generated to suit a route to a destination;

determine a state of an occupant of the vehicle;

learn automated driving control so that the state of the occupant approaches a predetermined state based on a following combination of (a) to (c): (a) a behavior of the vehicle occurring with the automated driving control to be executed; (b) a notification to the vehicle occupant of information relating to the automated driving control; and (c) the state of the occupant determined after either the behavior of the vehicle or the information notification to the vehicle occupant generate a changed target trajectory used to learn a portion of the changed target trajectory or an entirety of the target trajectory, and execute automated driving of the vehicle along the changed target trajectory;

when the automatic driving control based on the target trajectory is being executed, learn the automatic driving control so that the state of the occupant during execution of the automatic driving control based on the changed target trajectory approaches the predetermined state based on the state of the occupant;

when the automatic driving control to drive the vehicle along the changed target trajectory is being learned, notify the occupant of the information indicating that the automatic driving control is being executed; and when a width of the changed target trajectory from the target trajectory is smaller than a threshold value, does not notify the occupant that the automatic driving control is being learned even when the automatic driving control to drive the vehicle along the trajectory is being executed.

* * * * *